United States Patent [19]

Henits et al.

[11] Patent Number: 5,448,420
[45] Date of Patent: Sep. 5, 1995

[54] METHOD AND A SYSTEM FOR STORING AUDIO

[75] Inventors: John Henits, Bethel; Robert B. Swick, Stratford, both of Conn.

[73] Assignee: Dictaphone Corporation, Stratford, Conn.

[21] Appl. No.: 100,401

[22] Filed: Aug. 2, 1993

[51] Int. Cl.⁶ .......................... G11B 5/09; H04M 1/64
[52] U.S. Cl. .......................... 360/48; 360/32; 379/88
[58] Field of Search .......... 360/5, 6, 14.3, 27, 360/32, 48; 379/68, 70, 73, 75, 85, 88

[56] References Cited

U.S. PATENT DOCUMENTS

| | | | |
|---|---|---|---|
| 4,873,589 | 10/1989 | Inazawa et al. | 360/32 |
| 4,939,595 | 7/1990 | Yoshimoto et al. | 360/32 |
| 5,091,807 | 2/1992 | Baus, Jr. et al. | 360/71 |
| 5,179,479 | 1/1993 | Ahn | 360/72.1 |
| 5,285,326 | 2/1994 | Fukumi | 360/32 |
| 5,305,375 | 4/1994 | Sagara et al. | 379/88 |
| 5,321,561 | 6/1994 | Barr et al. | 360/48 |

*Primary Examiner*—A. Psitos
*Assistant Examiner*—W. Chris Kim
*Attorney, Agent, or Firm*—Ronald Reichman; Melvin J. Scolnick

[57] ABSTRACT

An apparatus and method have been conceived for using a digital audio tape (DAT) in an audio logger for the purposes of storing and retrieving audio data. This is accomplished in a manner such that the data is received and recorded in a time related manner. Provision is made for accommodating the transfer drive rate of the DAT through use of a buffer between the signal processor of the logger and the DAT. In addition, the method of storing the data results in greater use of the available space on the DAT as the DAT tape only writes for those periods when audio is present on a channel.

19 Claims, 6 Drawing Sheets

FIG. 4

RECORD SESSION TABLE

| START TIME (74) | END TIME (76) | CHANNELS IN RECORD (78) | STARTING FILEMARK # (80) |
|---|---|---|---|
| 1:00 | 2:00 | 1-32 | 000 |
| 4:00 | 11:00 | 1-16  18-32 | 600 |
| 13:00 | 15:00 | 1-32 | 4800 |
| | | | |
| | | | |
| | | | |
| | | | |
| | | | |
| | | | |
| | | | |
| | | | |
| | | | |
| | | | |
| | | | |

METHOD AND A SYSTEM FOR STORING AUDIO

BACKGROUND OF THE INVENTION

Audio loggers are known devices that are used for the purpose of obtaining records of voice communication. They have particular use in police stations, hospitals, prisons, brokerage houses and other locations where there is a need to record a conversation or other audio and the time and date thereof. The tapes upon which audio is written are stored for archival purposes. Prior loggers were based on continuous, real time analogue voice signal processing. Although analog loggers worked well, they have the disadvantage of requiring large amounts of tape space for storing audio.

Recently, digital loggers that use digital audio tapes (DATs) have become commercially available. Although these digital audio loggers offer advantages over prior analog loggers in terms of space requirements, they have certain drawbacks. One problem found with prior digital audio loggers is that the DATs do not provide an efficient time related scheme whereby conversations which took place at a particular time can be quickly and reliably retrieved. Another disadvantage is that the prior digital audio loggers do not utilize the maximum amount of recording space available on the DATs. Still another disadvantage of prior digital audio loggers is that the DAT drives used with such loggers experience greater wear because of their use whether or not audio is being written.

SUMMARY OF THE INVENTION

Apparatus and method have been conceived wherein digital audio tapes (DATs) can have audio stored therein in a time based retrievable manner. The term audio is intended to include any sound that is received over a channel such as conversations, orders, cries, background noise and the like. In addition, more of the space in the DAT is utilized for the purpose of recording audio as the tape deck is active only when audio is received. This is accomplished by using a system that first receives and converts audio signals from analog signals to digital signals and then compresses the digital signals at a lower frequency, such as from 64 k bits/sec/channel to 13 k bits/sec/channel. After the digital signals are compressed, they are written into a buffer. The data is subsequently retrieved from the buffer and written into the DAT. In this way, the buffer is used to match the digitizing rates of the audio processing system to the DAT drive transfer rate. In addition, recording space is consumed on a DAT only when audio is received and not for silent periods.

A format is provided wherein the DAT is divided into a primary partition and secondary partition. The primary partition includes a plurality of a filemarks. Each filemark is followed by a header and at least one data group, each data group having a plurality of audio blocks. Each audio block contains audio from a respective channel. When there is no audio on any channel, no header or group is generated and the tape would have a plurality of successive filemarks. Each filemark represents a unit of time, as for example six seconds, and each group has an allotted time, as for example approximately 1.2 seconds. There are, for example, five allotted time periods between filemarks. Space allocation for a group occurs if any audio block of that group receives audio during the allotted time. Even though each group may not use its allotted time, each filemark still represents six seconds. Each group has a given number of audio blocks, as for example 32, each audio block representing 1.2 seconds. Thus, if any audio block receives audio from its respective channel for its allotted 1.2 seconds, the data group will represent 1.2 seconds.

Each header contains a group map which defines a correspondence between the audio block (channel) number and the group number and indicates the presence or absence of audio from particular channels. This group map is used to locate audio data recorded on each audio block of a group.

Use of the above described format results in a correlation between the time audio is transmitted and the location of the audio on the DAT since each filemark represents a fixed duration such as six seconds.

BRIEF DESCRIPTION OF THE DRAWING

FIG. 4 is an illustration of a record session table;

DETAILED DESCRIPTION OF THE PREFERRED EMBODIMENT(S)

Figure 1:
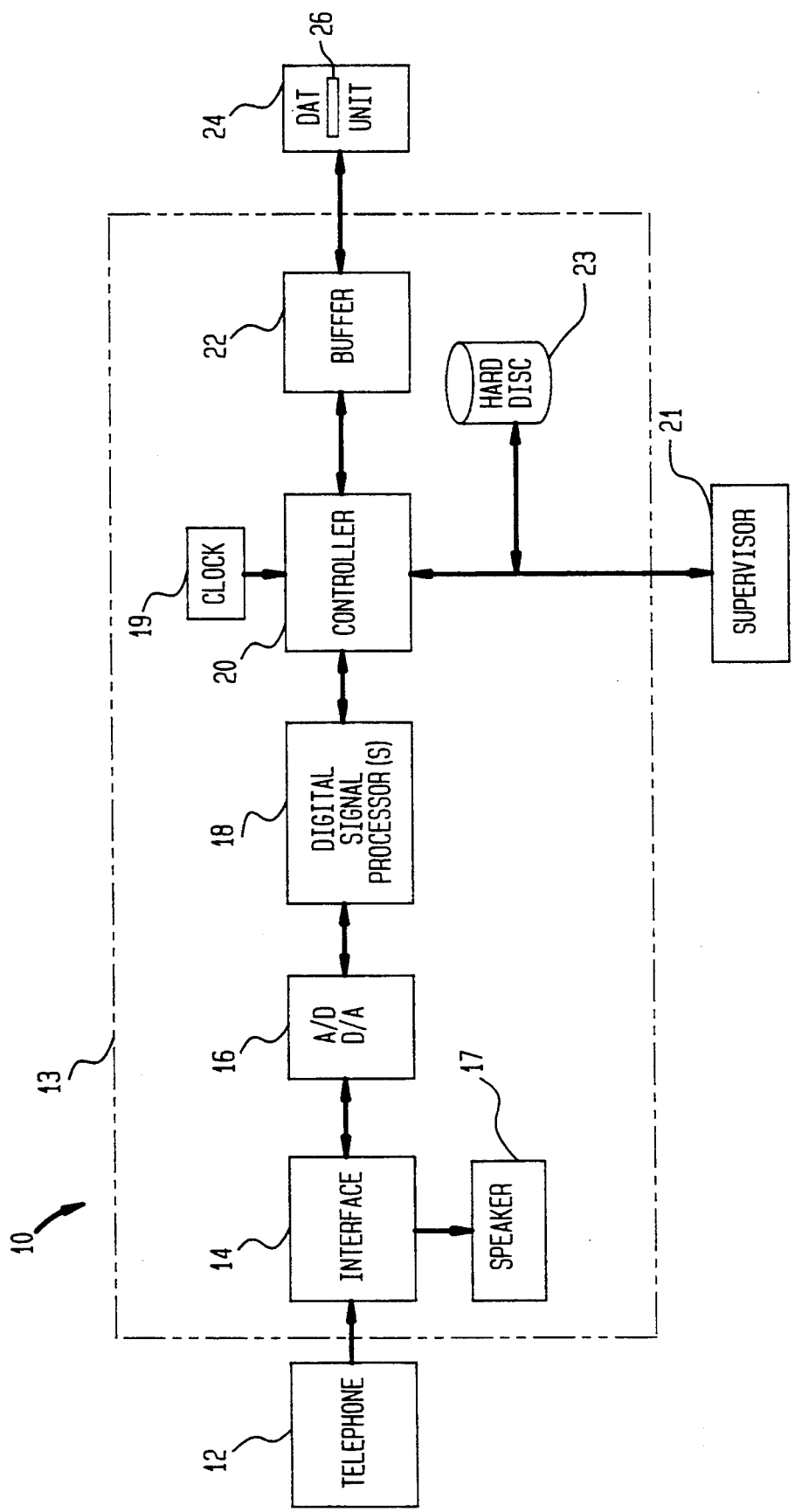
FIG. 1 is a functional block diagram showing apparatus in which the instant invention can be practiced.

With reference to FIG. 1, a system is shown generally at 10 in which the instant invention can be performed. A plurality of audio sources 12, such as 32 telephones, transmit audio to an interface 14 of a voice processing system 13. Although the invention will be described with telephones, it will be appreciated the invention can be used with other sources of audio such as police radios. The interface 14 is in communication with a speaker 17 and with an analog/digital (A/D) and digital/analog convertor (D/A) 16 that will convert analogue signals received from the telephones 12 to digital signal when data is flowing in one direction and digital to analog when data flows in the opposite direction. A digital signal processor 18 is in communication with the converter 16 and performs the function of compressing the digital voice signals by use of a voice compression algorithm as is known in the art, as for example, from 64 k bits/sec/channel to 13 k bits/sec/channel. Although only one digital signal processor 18 is shown, it will be appreciated that in practice a plurality of signal processors may be required. The compressed data are received by a controller 20 that arranges the data in a prescribed order and controls the flow of the data. In communication with the controller 20 is a clock 19 that provides the time and date, a buffer 22 that stores data, a storage device such as a hard disc-23 and a supervisor 21 that provides access to the system 10. The buffer 22 is a random access memory device that communicates with a digital audio tape (DAT) drive 24 that drives a DAT 26. Again, only one DAT drive 24 is shown, but in practice a plurality may be required. Audio can also be stored on and retrieved from the hard disc 23, which allows one to access audio without interfering with the recording by the DATS. The supervisor 21 can be any device, such as a personal computer, that allows one to retrieve audio written in or hard disc 23 and have the audio reproduced on the speaker 17. Reference can be had to co-pending U.S. patent application Ser. No. 07/815,207 that provides details of a voice processing system such as that shown generally at 10 and copending U.S. patent application Ser. No. 07/815,207 that shows and describes details of the main circuit board of the voice processing system. In addition, reference can be had to the concurrently filed patent application having title Modular Digital Logger Using Digital Audio Tapes, which is hereby incorporated by reference and which shows and describes details of the system 10.

In operation, a telephone call is received from one of the thirty two telephones (channels) and the analog signals received therefrom are converted to digital signals by the convertor 16, then compressed by the digital signal processor 18. Clearly, if a digital phone 12 is used there is no need for the A/D conversion and the signals will be passed through the converted 16 with no activity. After the digital signals are compressed, the digital signal processor 18 formats the information for subsequent storage and retrieval as will be described hereinafter with regard to the tape format. The formatted data is received by the controller 20 and time data is received from the clock 19.

The data is transferred from the controller 20 to the buffer 22. Data is stored in the buffer 22 while the DAT drive 24 is disabled. Upon sufficient audio data being received within the buffer 22, the DAT drive 24 will be enabled to receive the data thereby using the full capacity of the DAT 26 and preventing wear on the DAT drive 24. More specifically, a DAT is able to receive data of a rather fast rate, as for example 183K bytes/sec. A system 10 such as that described will operate at a frequency of 13 k bits/sec channel which is approximately 1600 bytes/sec/channel/maximum system data rate of approximately 52 k bytes/sec. If data were to be written on the DAT at this low rate, it would result in unnecessary wear on the head of the tape deck 24. Thus, the buffer 22 serves two purposes, that of sending active audio to the DAT 26 at a rate that will match the capacity of the DAT and allowing more audio to be stored on a DAT by formatting audio to be written onto the DAT.

When audio is to be retrieved from a DAT 26, the controller 20 will search for the appropriate location in response to a command from the supervisor 21, and have the selected data sent through the buffer 22 to the controller. The digital voice data is expanded to 64 k bits/sec by the digital signal processor 18 from 13 k bits/sec, converted from digital to analog by the converter 16 and transmitted to the speaker 17 through the interface 14 where the retrieved audio can be heard.

Figure 2:
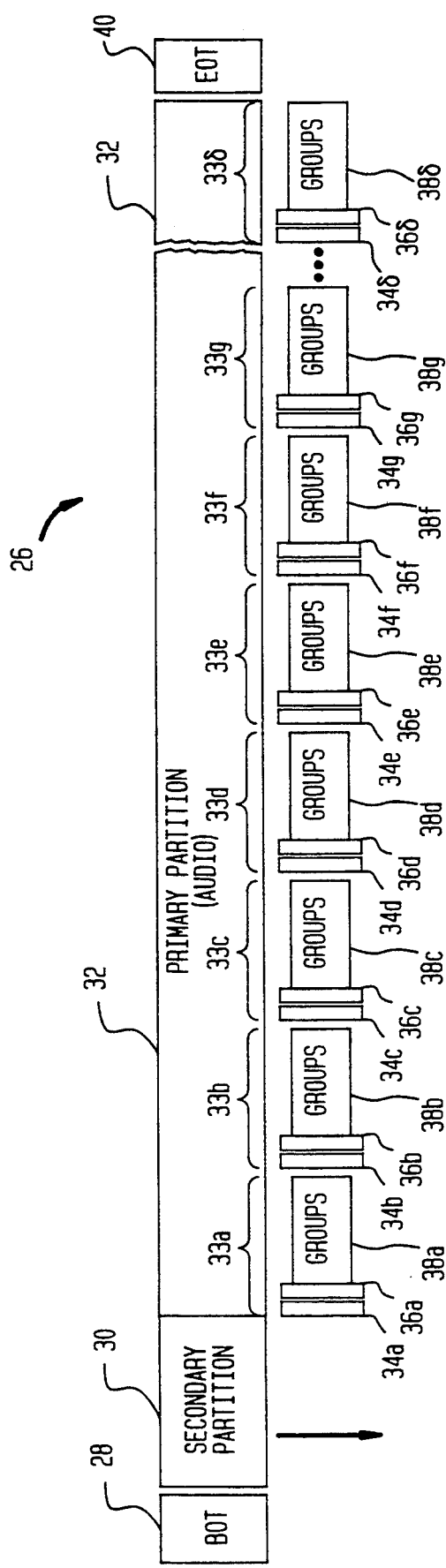
FIG. 2 is a block diagram illustrating the partitions of a DAT in accordance with the instant invention.

With reference to FIG. 2 the formatting of a DAT 26 in accordance with the instant invention will be described. There is a beginning of the tape (BOT) portion 28 that is part of a secondary partition 30. The secondary portion 30 stores the times of the beginning and end of a tape and the time and length of sessions there between, which times are received from the clock 19. The secondary partition 30 can contain information such as the media format, the manufacturers identification, the product identification in terms of model number of the recorder that formatted the DAT, the drive vendor, the logic unit type, the logic unit software version, and other information of this type. In addition, the secondary partition stores tables that will be described hereinafter. Adjacent to the secondary partition 30 is the primary, or audio, partition 32 that is divided into a plurality of frames 33a–33δ, each frame comprising filemarks 34a–34δ, headers 36a–36δ, each header being adjacent to a filemark, and data groups 38a–38δ adjacent to each header respectively. Each frame 33 may have a distinct number of groups, such as five. A filemark 34 is a fast search mechanism and is employed to perform fast, coarse positioning. Each DAT 26 contains recorded information beginning at a specific date and time, which is received from the clock 19 and stored in the secondary partition 30, thus making it possible to position the DAT to a specific date and time by selecting spaced filemarks 34. Each filemark 34a–34δ represents a given period, such as six seconds, of recording. The number of groups following to each header 36a–36δ is a distinct number, such as five, although not all groups will necessarily have audio. Each group 38 contains a number of audio blocks, such as 32 audio blocks, with each audio block having an audio channel reporting thereto, i.e., each audio block is associated with a telephone (audio source) line, or channel. The frames 33a, 33b, 33c . . . 33δ are followed by an end of tape (EDT) 40.

Each group 38 represents an allotted slice of time of approximately 1.2 seconds for the recording of audio. Each group is made up of a number of audio blocks, as for example 32, and each audio block represents 1.2 seconds of audio for its respective channel and will have approximately 2000 bytes if a 13 k bits/sec compression algorithm is used. All channels, or audio blocks, of the system do not have to be active at all times. One channel could be receiving data, two others may have a blip, i.e. no audio received, three others could be receiving data and so forth. The time between filemarks 34a–34g remains constant; however, the amount of data between the filemarks is variable so that each group 38 can occupy a different amount of space on a DAT. For example, if any of the audio blocks of a particular group 38a is receiving audio, only those blocks will record and the group will use all 1.2 of its allotted time, 2048 bytes for each audio block that is receiving audio during its allotted time. If no channel is active for another group 38b, the second group 38b will not occupy any space on the DAT and thus consume no time. The amount of data stored on a DAT for any 1.2 secs of elapsed time represents 38.4 secs of audio if all 32 channels are active.

Figure 3:
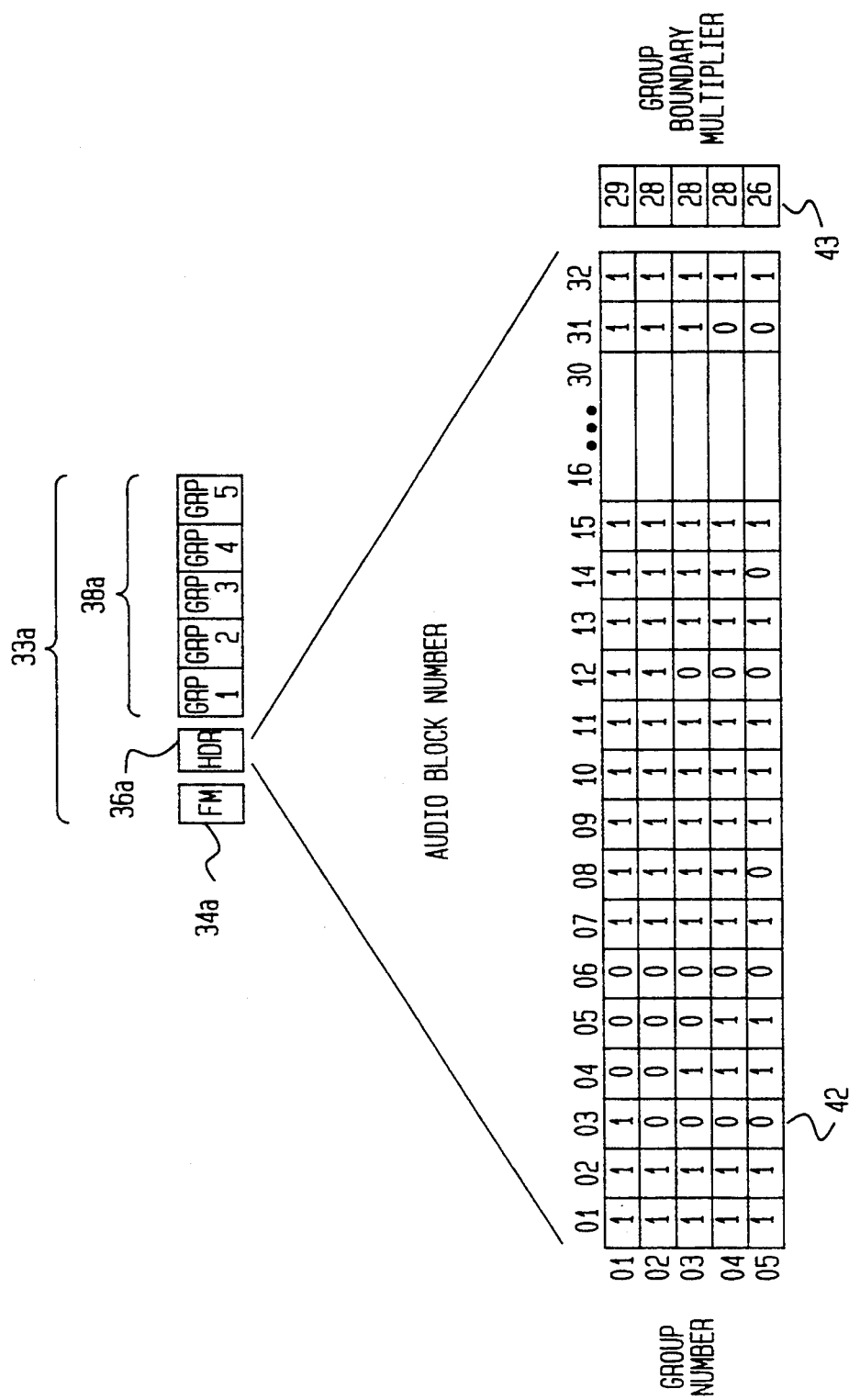
FIG. 3 is a block diagram illustrating the group may table contained in the formatted headers shown in FIG. 2.

With reference to FIG. 3 and 4, a group map table 42 indicative of the data contained in a single frame 33 and a record session table 73, respectively, are shown. The example given in FIG. 3 assumes there are 32 audio blocks in a group and five groups 38 between filemarks 34, each filemark representing six seconds of real time. With this scheme, one is able to correlate the time of a message to the location of the message on the tape 26. In cooperation with the system clock 19, the time of the start 74 of a recording session will be written into the secondary partition as well as the end time 76 of the recording section. In addition, the record session table records the active channels 78 during a session and the number 80 of the filemark at the beginning of a session. Because each filemark 36 represents six seconds of time, one knows that the audio data of the group following the filemark was recorded within six seconds of time. In addition, each group 38 represents 1.2 secs of time, therefore, one can determine the time within 1.2 seconds. The header 36 contains a table 42 indicating when each audio block, which corresponds to a channel, of each group has audio written therein by writing a one bit for recording and a zero bit for a blip, i.e., absence of audio. Thus, group 1 is shown to receive audio from channels 1–3, and 7–32, but no audio from channels 4–6 during that particular 1.2 second interval. Consequently, this group will only use 29/32 of the space allocated on the tape, and one can determine by inspection of the header the time within 1.2 seconds that audio was recorded on a particular channel. In group 2, audio blocks 1 and 2 recorded audio, audio blocks 3–6 had an absence of audio and audio blocks 7–32 recorded audio. Thus, group 2 only used 28/32 of its allotted tape length. Only when the "1's" are written in the map 42 will data be written. The group boundary multiplier 43 shows the total number of 1's written in the map and indicates the amount of data written into each group 38, i.e. space consumed by each group. The group boundary multiplier 43 is of value when a particular time is searched and will give an indication how far to drive the DAT to get the next group on the tape.

After each group map table 42 is written into its respective header 34, the data from the group map data are written into an accumulated table in the secondary partition as well. This header data is stored in the buffer and written into the accumulated table after a record session is complete. In this way, the secondary partition 30 will have an accumulated table representing the data in all header tables 42 on a tape 26. The beginning of a record session and end of the session which are written into the record session table 73 shown in FIG. 4. With the number of the filemark 34 for a given session, audio can be recovered rapidly through use of the supervisor 21. By session is meant the uninterrupted time that the system is enabled. Referring to FIG. 4, the first line of the record session table 73 has a starting time 74 of 1:00 and an end time 76 of 2:00 and a starting filemark 80 of 000. As there are six seconds between filemarks the last filemark of the first session will be numbered 559. Although the next session does not start until two hours later, because the system is disabled, no filemarks will have been generated during down time. When the second session does start, the filemark number will be 600 and because it is a seven hour session, the last number filemark will be 4799. The last section indicated will then start with filemark number 4800 and end with number 5999. It will be appreciated that the record session table 73 can be written into the hard disc 23 as can any other data from a DAT 26. It will be noted that one of the channels, channel 17, was not operative during the second session. Only the channels which are operative during a given session will be indicated in the channels in record column 78.

Figure 5:
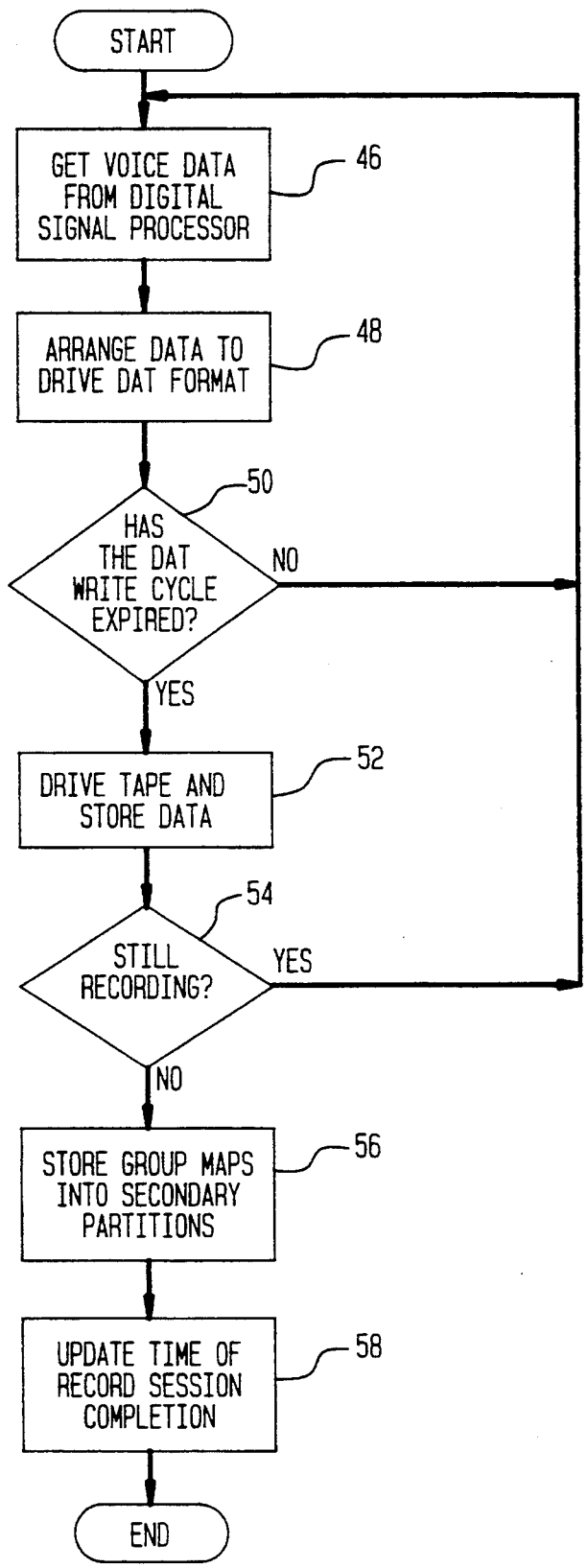
FIG. 5 is a high level flow chart representing a program for carrying out the steps of the instant invention.

Referring now to FIG. 5, a flow chart is shown representing a program for processing audio. Data is collected 46 from the digital signal processor 18 by the controller 20. The data is arranged in a prescribed order to drive 54 a DAT format, which arranging takes place in the buffer 22. The question is then asked 50 if a DAT write cycle has expired 50, i.e. if a prescribed amount of time has passed. More specifically, data will be accumulated in the buffer 22 until a given time has passed, such as one minute. After the time has expired, the data stored in the buffer 22 during that period will be dumped onto the DAT 26. For a one minute period, the data following ten filemarks will be dumped. If the inquiry is negative, there is a return to the data arrangement 54, but if yes, the data is stored and the DAT is driven 52. The question is then asked 54 whether the system is still recording. If yes, there is a return, but if no, the group maps 42 are stored 56 in the accumulated table of the secondary partition and the time of the record session completion is updated in the record session table 73.

Figure 6:
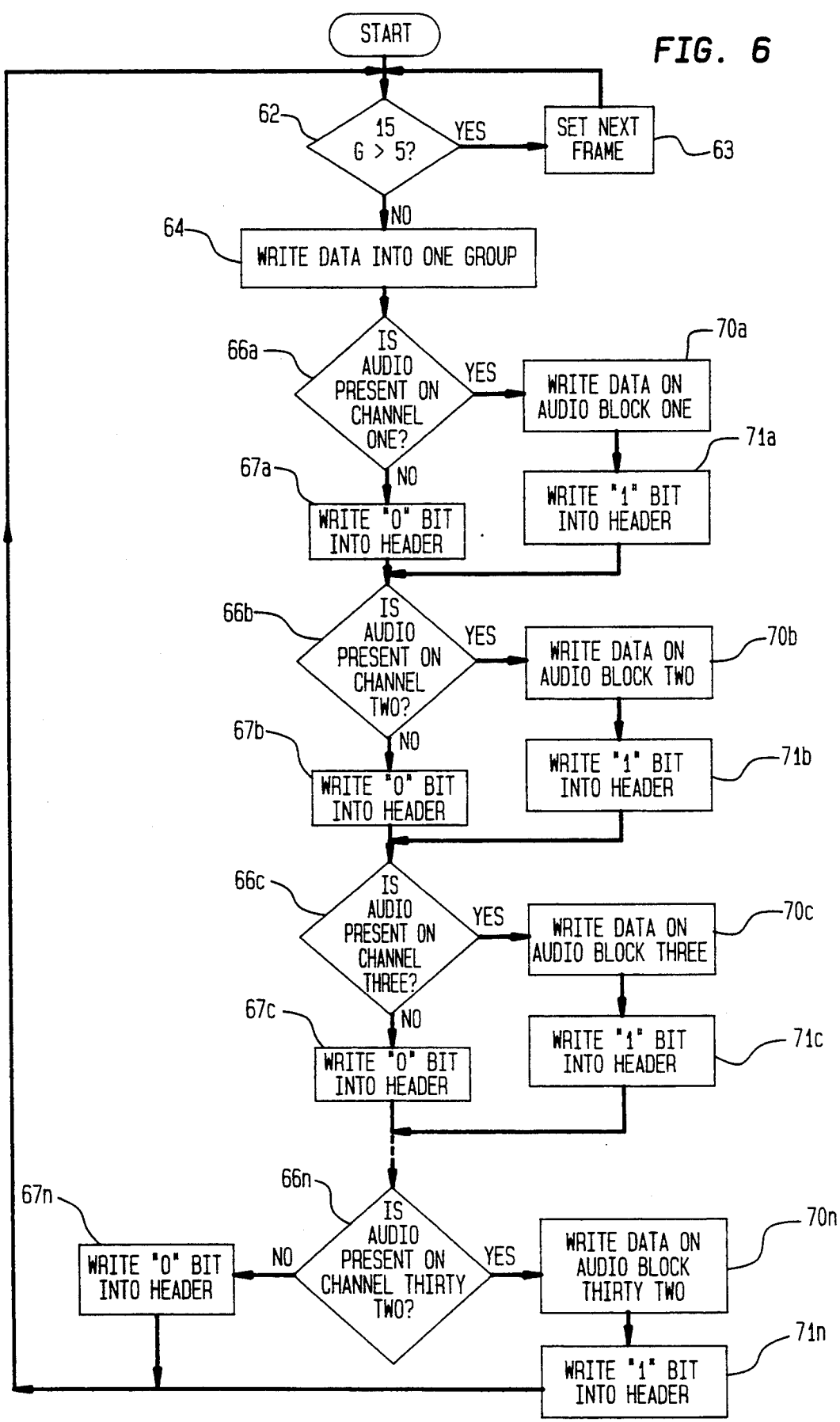
FIG. 6 is a flow chart detailing the arranging step of the flow chart of FIG. 5.

Referring now to FIG. 6, the details of the arranging of the data arranging step. 48 of FIG. 5 is described in detail. The question is asked 62 if the number of a group to be processed is greater than 5, assuming that the defined number of groups following a filemark 34 is five. If the answer is yes, then the next frame is set, but if the answer is no, a directive is given to write data into the particular group. An inquiry is made 66a whether audio is present on channel one of the group. If yes, data is written 70a into audio block one, and a "1" bit is written 71a into the group one, audio block one location of the table 42, see FIG. 3. If the inquiry is no, and a "0" bit is written 67a into the appropriate table 42 location. After audio block one is complete, the question is asked 66b whether audio is present on channel two. If no, a "zero" bit is written 67b in audio block two, group one location of the table 42, but if yes, data is written 70b into audio block 2, and a "1" bit is written 71b. After this, there is a return and another inquiry is made 66c as to whether audio is present on channel three. If not, a "0" bit is written into the table 42, but if so, data is written 70c into audio block three and a "1" bit is written 71c into the header table at the appropriate location. This continues until the last channel is serviced and there is a return after channel 32 has been serviced. An inquire is made 64 whether the group number is greater than five. If so, a new filemark is set for another frame 63, but if not, the routine is repeated for the next group.

Although the preferred embodiment has described the invention with regard to audio, it will be appreciated that the system 10 has applicability to processing other real time data including video and digital data streams.

Thus, what has been shown and described is a system and method whereby a DAT can be used with a digital audio logger in such a way that the physical capacity of the DAT is utilized more efficiently and there is a correlation between the time of the voice recording and the location of the voice written on the DAT for purposes of recovering audio data. In addition, the apparatus of the instant invention arranges data so that it can be written into the DAT at a rate compatible with the drive transfer rate of the DAT unit 24, thus extending the life of the tape deck drive.

The above embodiments have been given by way of illustration only, and other embodiments of the instant invention will be apparent to those skilled in the art from consideration of the detailed description. Accordingly, limitations on the instant invention are to be found only in the claims.

What is claimed is:

1. In a method of storing audio, the steps comprising:
   receiving audio from an audio source;
   compressing the audio;
   storing the compressed audio in a buffer, retrieving the compressed audio from the buffer and writing the compressed audio onto a digital audio tape from the buffer;
   recording the time audio is written into the digital audio tape, providing the digital audio tape with a primary partition and writing a plurality of filemarks onto the primary partition of the digital audio tape and defining a fixed period between the filemarks; and following each filemark by at least one data group with each data group composed of a plurality of audio blocks, wherein each audio block represents a respective channel for receiving audio.

2. The method of claim 1 further including the step of only storing active audio on a digital audio tape whereby storage space on the DAT is consumed only for active audio.

3. The method of claim 1 further including the step of following each file mark with a header having a group map that indicates the activity of audio written in the audio blocks proceeding the next file mark.

4. The method of claim 3 including the further steps of providing the audio digital tape with a secondary partition, providing the secondary partition with an accumulated table and writing data from the group maps of the header into the accumulated table of the secondary partition.

5. The method of claim 4 further including providing the secondary partition with a record session table and writing into the record session table the beginning time and final time of a record session.

6. The method of claim 5 including the step of writing the record session table data from the secondary portion to a storage device.

7. The method of claim 5 wherein the step of writing into the record session table of the secondary portion includes creating a record session table containing a plurality of record sessions, the time of the beginning of each record session, the time of the end of each record session, and the number of the filemark at the beginning of each session.

8. The method of claim 7 further including writing the number of active voice blocks for each group into each header.

9. The method of claim 8 further including the step of writing the accumulated table into a random access memory.

10. The method of claim 1 further including the step of only storing active audio on a digital audio tape whereby storage space is saved.

11. The method of claim 10 wherein said step of receiving audio from an audio source includes receiving audio from a plurality of audio sources.

12. In a system for processing audio, the combination comprising:
an interface for receiving audio from an audio source;
a digital signal processor in communication with the interface for compressing the audio signals;
a controller in communication with the digital signal processor for receiving audio therefrom and arranging data in a prescribed order;
a buffer in communication with the controller for receiving arranged audio from the controller;
a digital audio tape drive in communication with the buffer for receiving arranged audio from the buffer whereby a digital audio tape driven by said digital audio drive receives audio at a rate that matches the transfer drive rate of the digital audio tape; and
said digital audio tape received within said digital audio tape drive, said digital audio tape defining a plurality of filemarks, each filemark dividing said audio digital tape into a fixed period, wherein each of said filemarks is followed by at least one group containing a plurality of audio blocks and each audio block receives audio from a designated channel of an audio source;
a converter intermediate said interface and said digital signal processor for converting audio signals from analogue to digital and transmitting digital signals to said digital signal processor, and
a speaker in communication with said interface wherein, said converter having means for converting digital signal received from said digital signal processor to analogue signals whereupon analogue signals are sent from said interface to said speaker.

13. The system of claim 12 wherein said at least one group is preceded by a header and each header indicates the audio writing activity of each audio block of said at least one group.

14. The system of claim 12 wherein each filemark is followed by a header and a plurality of groups, each group having a plurality of audio blocks, each header indicating the presence and absence of audio written into each of said audio blocks of said plurality of groups.

15. In a method of formatting a digital audio tape to be used in a digital audio logger that communicates with a plurality of audio sources, the logger having an interface for receiving audio, a processor in communication with the interface for compressing digital signals; a processor for arranging the audio and a tape deck for receiving a digital audio tape, the steps comprising:
a) writing a plurality of filemarks on a digital audio tape in a time related manner with each filemark representing a defined period of time,
b) providing a plurality of groups after each filemark, each group comprising a plurality of audio blocks,
c) allocating a period of recording time for each group for writing audio from channels carrying audio from audio sources and
d) providing a header intermediate each filemark and the respective groups of a filemark and writing a table into each header that indicates the activity of each audio block of the groups following said header.

16. The method of claim 15 further including the step of writing the data in the tables of all headers into the location on the digital audio tape.

17. The method of claim 15 further including the step of writing the data from said one location on the digital audio tape onto a random access memory.

18. The method of claim 17 further including the step of numbering the filemarks in sequence.

19. The method of claim 15 including the further step of writing a record session table into the one location, with the record session indicating the times of the beginning and end of recording sessions and the number of the filemark at the beginning of each session.

* * * * *